US008072877B2

(12) United States Patent
Fredriksson

(10) Patent No.: US 8,072,877 B2
(45) Date of Patent: Dec. 6, 2011

(54) ARRANGEMENT IN A DISTRIBUTED CONTROL SYSTEM FOR INCREASING THE AVAILABILITY OF DATA AND/OR CONTROL COMMANDS

(75) Inventor: Lars-Berno Fredriksson, Kinna (SE)

(73) Assignee: Xinshu Management, L.L.C., Dover, DE (US)

( * ) Notice: Subject to any disclaimer, the term of this patent is extended or adjusted under 35 U.S.C. 154(b) by 1103 days.

(21) Appl. No.: 10/380,069

(22) PCT Filed: Sep. 4, 2001

(86) PCT No.: PCT/SE01/01878
§ 371 (c)(1),
(2), (4) Date: Sep. 8, 2004

(87) PCT Pub. No.: WO02/23938
PCT Pub. Date: Mar. 21, 2002

(65) Prior Publication Data
US 2005/0030969 A1    Feb. 10, 2005

(30) Foreign Application Priority Data

Sep. 12, 2000    (SE) ........................................ 0003217

(51) Int. Cl.
*G06F 11/00*    (2006.01)
(52) U.S. Cl. .................... 370/217; 370/402; 370/465
(58) Field of Classification Search .................. 370/454, 370/230, 230.1, 235, 237, 217, 218, 221, 370/263, 465; 455/63.1, 114.2, 278.1, 296, 455/68, 443, 454, 569.2; 342/451, 463–365
See application file for complete search history.

(56) References Cited

U.S. PATENT DOCUMENTS 4,422,171 A * 12/1983 Wortley et al. ................ 714/748
4,566,096 A *  1/1986 Sarson et al. .................. 370/263
(Continued)

OTHER PUBLICATIONS

Horst Wunderlich et al., "Opening Bluetooth for Technical Tasks—Possiblities and Challenges for Automotive Applications", Bluetooth Conference in Monte Carlo, Jun. 13-16, 2000, pp. 13-16.

(Continued)

*Primary Examiner* — Andrew Lai
(74) *Attorney, Agent, or Firm* — Brundidge & Stanger, P.C.

(57) ABSTRACT

There is a need for increasing the availability of data and/or control commands in a distributed control system for one or more machines, vehicles and/or processes. The control system comprises or is controlled by a transmitting node or transmitter unit and has two or more receiving nodes. The transmitting nodes and receiving nodes are connected to each other via wireless radio links. The receiving nodes are located at a distance from each other and are connected to a few-wire digital link in a wired system for forwarding of the said data and/or control commands to the executing devices. The control node transmits the said data and/or the control commands in different directions towards the receiving nodes which are arranged at a distance from each other. Receiving nodes with reception that is essentially not subject to interference are arranged to be able to connect to the few-wire link in parallel and simultaneously with a receiver unit or units which have links that are connected to the few-wire link. In another case, only those receiver unit or units are connected that have reception links that are not subject to interference, while the receiver unit of units with links that are subject to interference do not participate in the transmission of the message on the few-wire link.

33 Claims, 9 Drawing Sheets

U.S. PATENT DOCUMENTS

Figure 1:
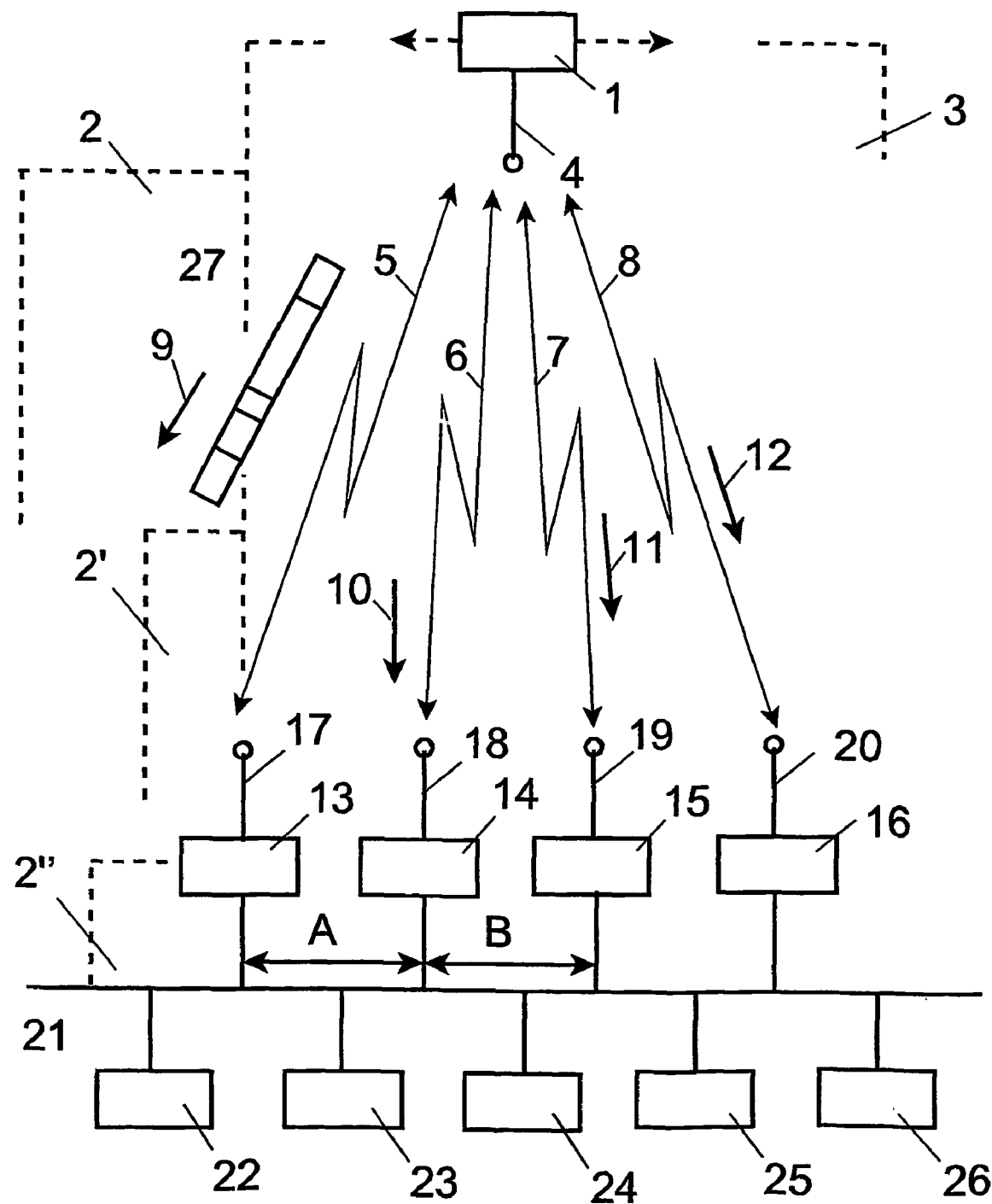

| | | | | |
|---|---|---|---|---|
| 4,807,224 A | * | 2/1989 | Naron et al. | 370/218 |
| 5,047,762 A | * | 9/1991 | Bruckert | 455/443 |
| 5,150,310 A | * | 9/1992 | Greenspun et al. | 342/451 |
| 5,428,819 A | * | 6/1995 | Wang et al. | 455/454 |
| 5,452,306 A | * | 9/1995 | Turudic et al. | 370/465 |
| 5,608,410 A | * | 3/1997 | Stilp et al. | 342/387 |
| 5,740,174 A | * | 4/1998 | Somer | 370/402 |
| 5,801,865 A | * | 9/1998 | Weis et al. | 398/113 |
| 6,151,484 A | * | 11/2000 | Ramesh | 455/68 |
| 6,321,068 B1 | * | 11/2001 | Zamat | 455/69 |
| 6,377,825 B1 | * | 4/2002 | Kennedy et al. | 455/569.2 |
| 7,046,638 B1 | * | 5/2006 | Klausner et al. | 370/313 |

OTHER PUBLICATIONS

International Search Report for International Application No. PCT/SE01/01878 dated Dec. 4, 2001, 2 pages.

International Preliminary Examination Report for International Application No. PCT/SE01/01878 completed on Nov. 12, 2002, 11 pages.

* cited by examiner

ARRANGEMENT IN A DISTRIBUTED CONTROL SYSTEM FOR INCREASING THE AVAILABILITY OF DATA AND/OR CONTROL COMMANDS

CROSS-REFERENCE TO RELATED APPLICATIONS

This application is a U.S. national phase application filed under 35 U.S.C. §371 of International Application PCT/SE01/01878, filed on Sep. 4, 2001, designating the United States, which claims priority from Swedish Application 0003217-7, filed Sep. 12, 2000, which are hereby incorporated herein by reference in their entirety.

The present invention relates to an arrangement for increasing the availability of data and/or control commands in a distributed control system for one or more machines, vehicles and/or processes. The control system is thereby able to be controlled by or comprises at least one transmitting node or transmitter unit. The control system also comprises two or more receiving nodes. The transmitting node or transmitter unit and the receiving nodes are able to be connected together or are connected together via wireless links, by which is meant here principally radio links. The receiving nodes are situated geographically separated from each other and are connected to a few-wire digital connection in a wired system for forwarding the said data and/or control commands to executing devices for the functions, measurements, etc, in question.

The invention is associated with the invention according to the Swedish patent application 0001148-6. Reference is made to this application and to the references mentioned in this application. Reference is also made to EP 513137 and 470199. All the references relate to the same Applicant as the present patent application.

In connection with so-called field busses, that is to systems of the type CAN (Controller Area Network) and CAN Kingdom (developed by the Applicant of the present patent application), there is a need for availability to be able to be extended or increased in various practical situations. With wireless links, in particular radio links that are used in connection with Bluetooth, there can be cases when the link for various reasons is subject to interference between the transmitting and receiving nodes or units. The invention relates, among other things, to solving this problem.

It is essential that proposed measures can be incorporated in the functions of the utilized systems, so that these do not need to be modified and allocated new functions. The invention also solves this problem and proposes, for example, a technically simple and also economically advantageous solution in association with field busses of the said type.

The principle characteristics of the new invention can be considered to be, among other things, that the control node or control unit is arranged to transmit the data and/or control commands in question in parallel and simultaneously in various directions to the geographically-separated receiving nodes. The invention is also characterized in principle by two different functional cases. In the first functional case, the wireless links between the transmitting nodes or transmitter units and the receiving nodes are essentially not subject to interference. In this case, the receiving nodes are arranged to be connected in parallel and simultaneously to the few-wire link. Using the parallel and simultaneous connection, the receiver units transmit the said received data and/or control commands in parallel and simultaneously to the few-wire link and thereby to the executing device or devices concerned, which devices execute the functions in question in the distributed control system. In the second functional case, the wireless link or links between the transmitting node or transmitter unit and one or more associated receiving nodes are essentially subject to interference. The receiving node or nodes are thereby prevented from making their connection or connections to the few-wire link. In this second functional case, the transmission of the said data and/or control commands to the few-wire link and respective executing device is carried out using only the receiver device or devices that have wireless link or links that are essentially not subject to interference.

In a preferred embodiment, the control node or control unit transmits on different frequencies to the said receiving nodes. Messages with the said data and/or control commands are thus transmitted on the said different frequencies.

In a preferred embodiment, the distributed control system consists of one or more systems of the control area system type (=CAN), where the control nodes are synchronized with each other or coordinated with the connection and arbitration functions of the few-wire link. This means that they simultaneously obtain access to the few-wire link in the event of messages that are essentially not subject to interference being received from the transmitting node or unit. In the absence of coordinated connections, due to messages from the transmitting node or unit being essentially subject to interference or absent, the respective receiving node obtains information via the few-wire link concerning cancelling further attempts to connect to the few-wire link after the receiving node with the link that is essentially not subject to interference has concluded the transmission of the message on the few-wire link.

The respective receiver unit is thus preferably arranged, in the event of a message from the transmitting node or transmitter unit being essentially subject to interference or absent, to receive or detect all or parts of the message that was transmitted on the few-wire link from the receiver unit or receiver units with message(s) that are essentially not subject to interference. The respective receiver unit with messages subject to interference or absent will thus, upon the reception of the said transmitted part of the message or upon the reception of the transmitted message, inhibit continued attempts to access the few-wire link.

The said data and/or control commands can be incorporated in or can form messages with control system identification, data and data link codes and control codes. The respective receiving node can be arranged in the event of a predetermined level of interference in its received message to generate an internal cancelling signal that prevents the connection of the receiving node to the few-wire link. The receiving node can also be arranged, in the event of interference to messages above a predetermined value, to implement an arrangement between the receiving nodes that selects the receiving node which at the time of the reception has the reception which is subject to the least interference and can be arranged so that only the receiving node thereby selected obtains access to the few-wire link for transmission of its received message upon this. Further developments of the invention will be apparent from the following subsidiary claims.

What is proposed above has advantages, for example, in association with service functions and service installations for cars, where the car or corresponding vehicle is used or set up indoors or outdoors and where various interference phenomena can arise, for example, associated with movements of other adjacent vehicles, movements in working tools, movements of personnel, etc. In association with CAN systems, existing connection and arbitration functions can be utilized. Existing types of message can likewise be utilized.

Figure 2:
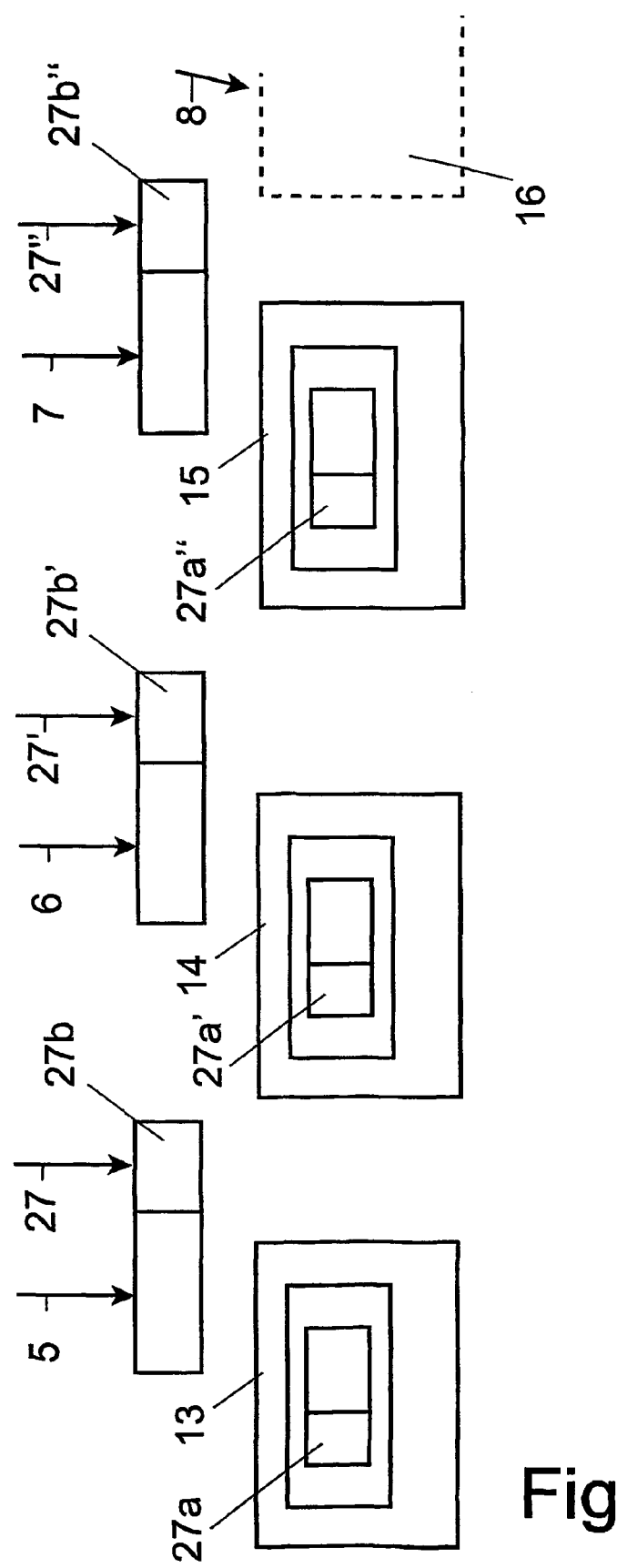
Figure 3:
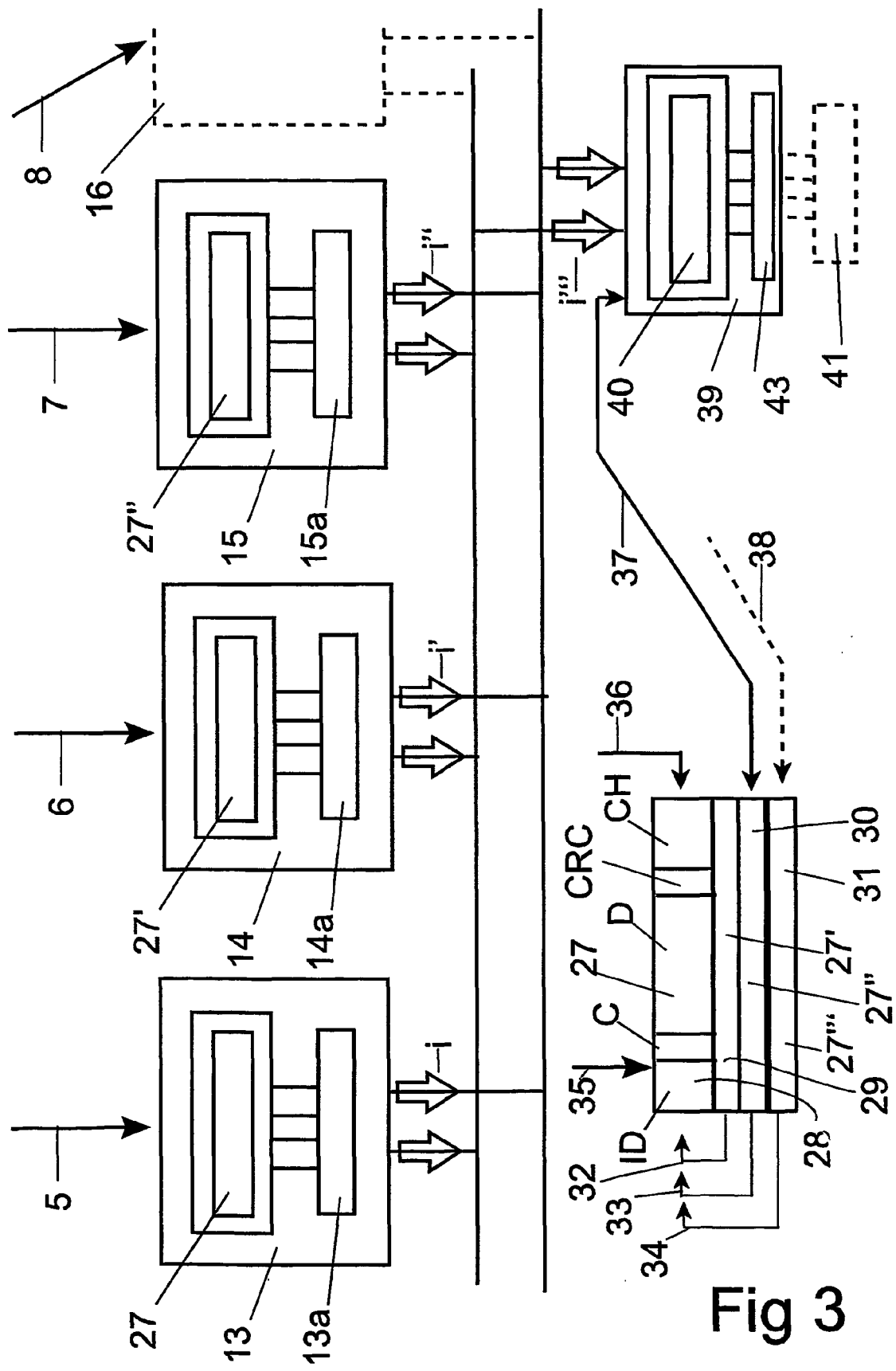
Figure 4:
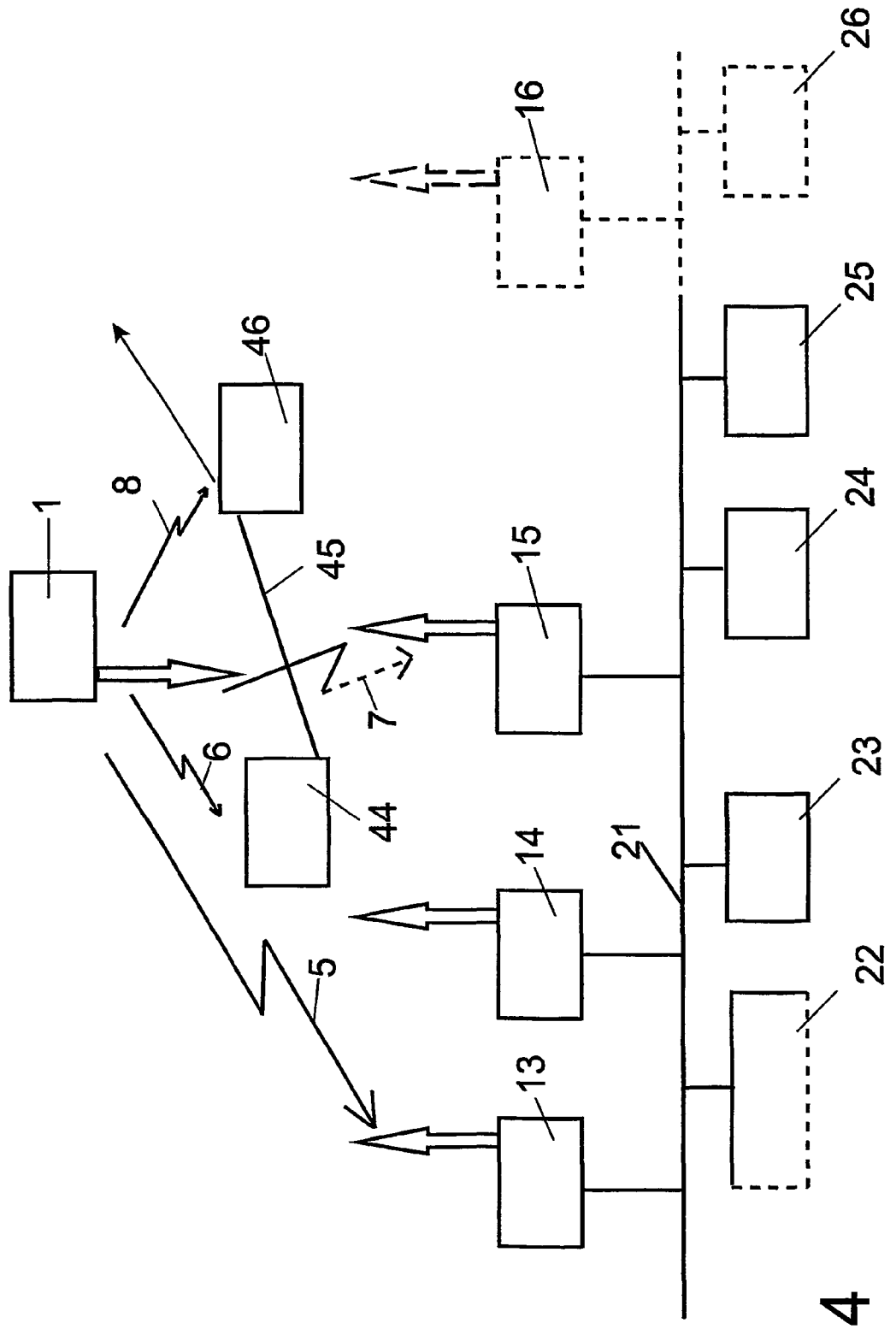
Figure 5:
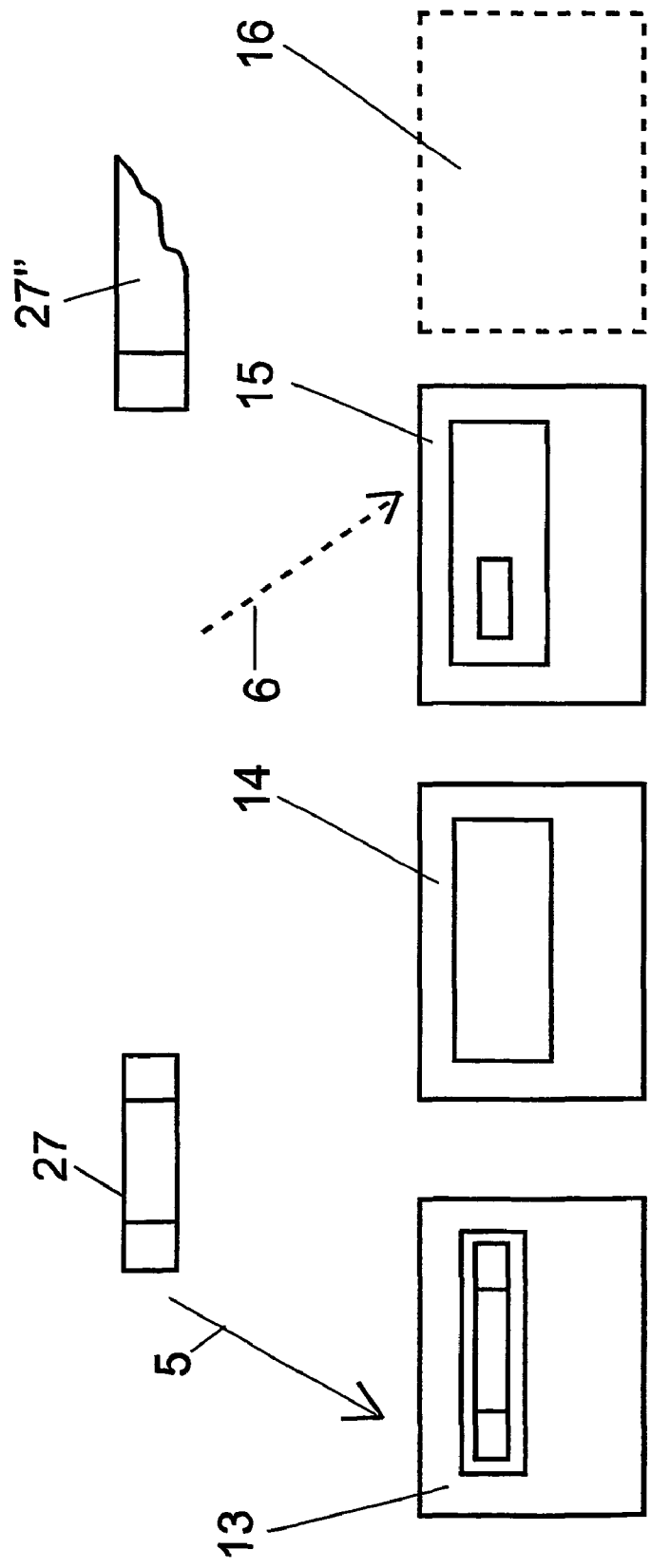
Figure 6:
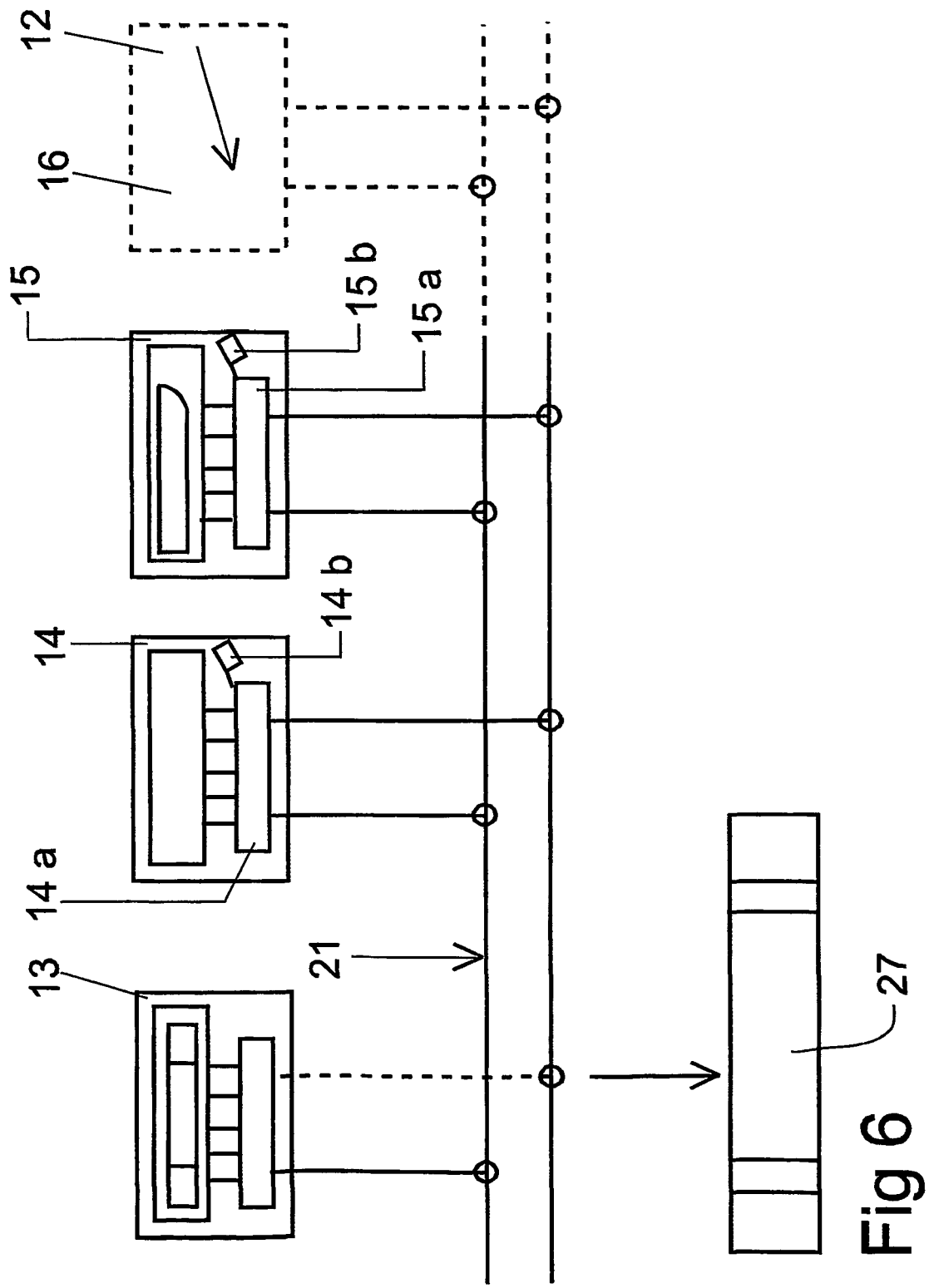
Figure 7:
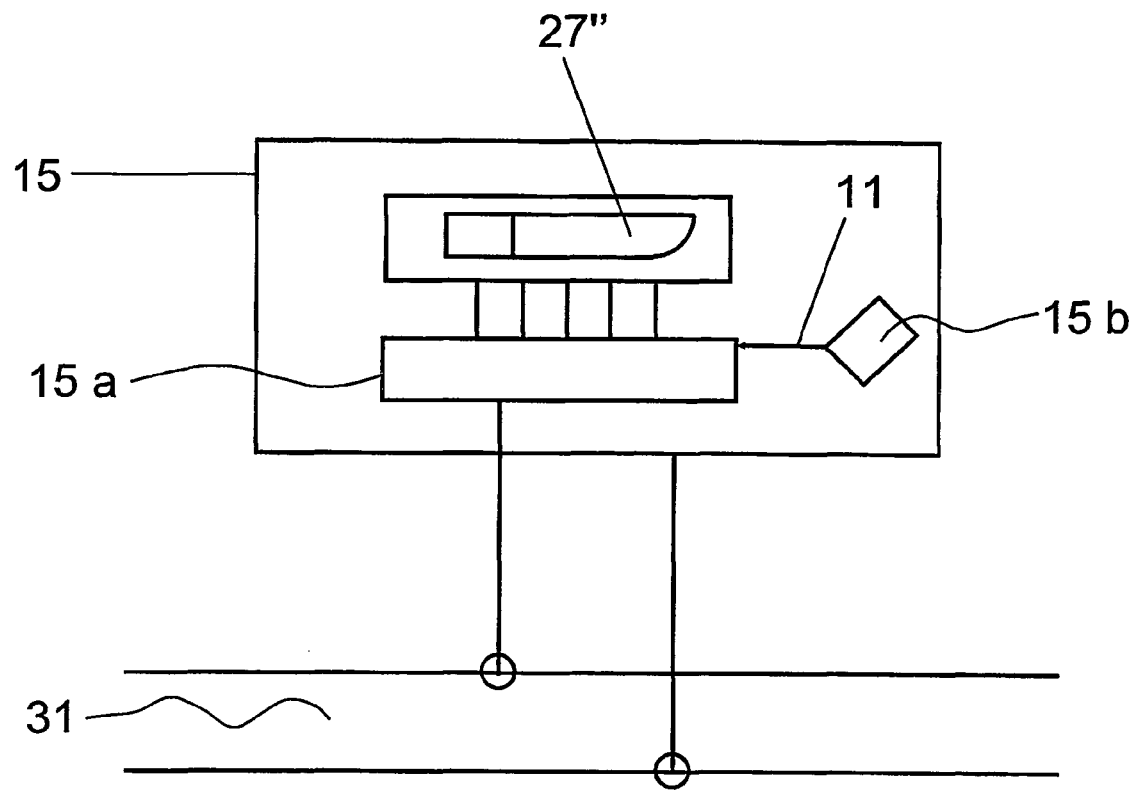
Figure 8:
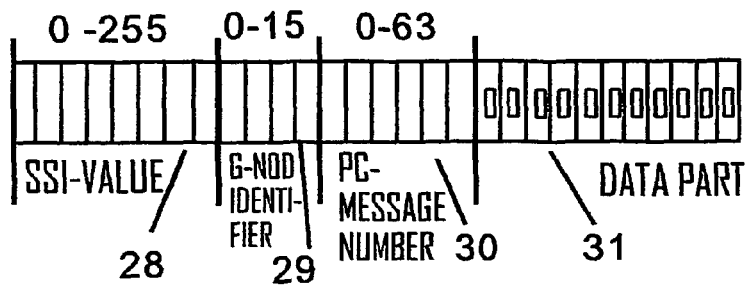
Figure 9:
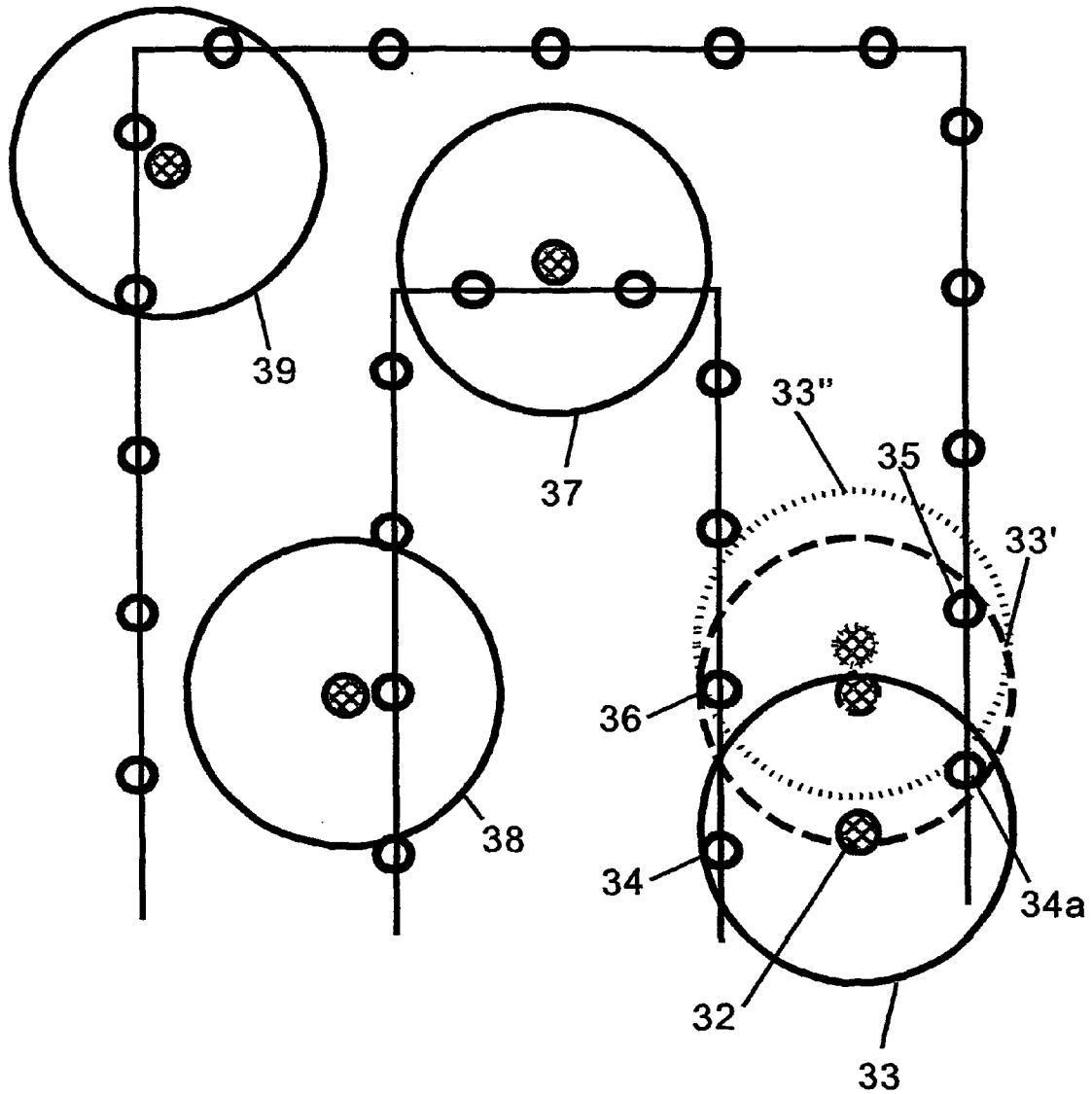
Figure 10:
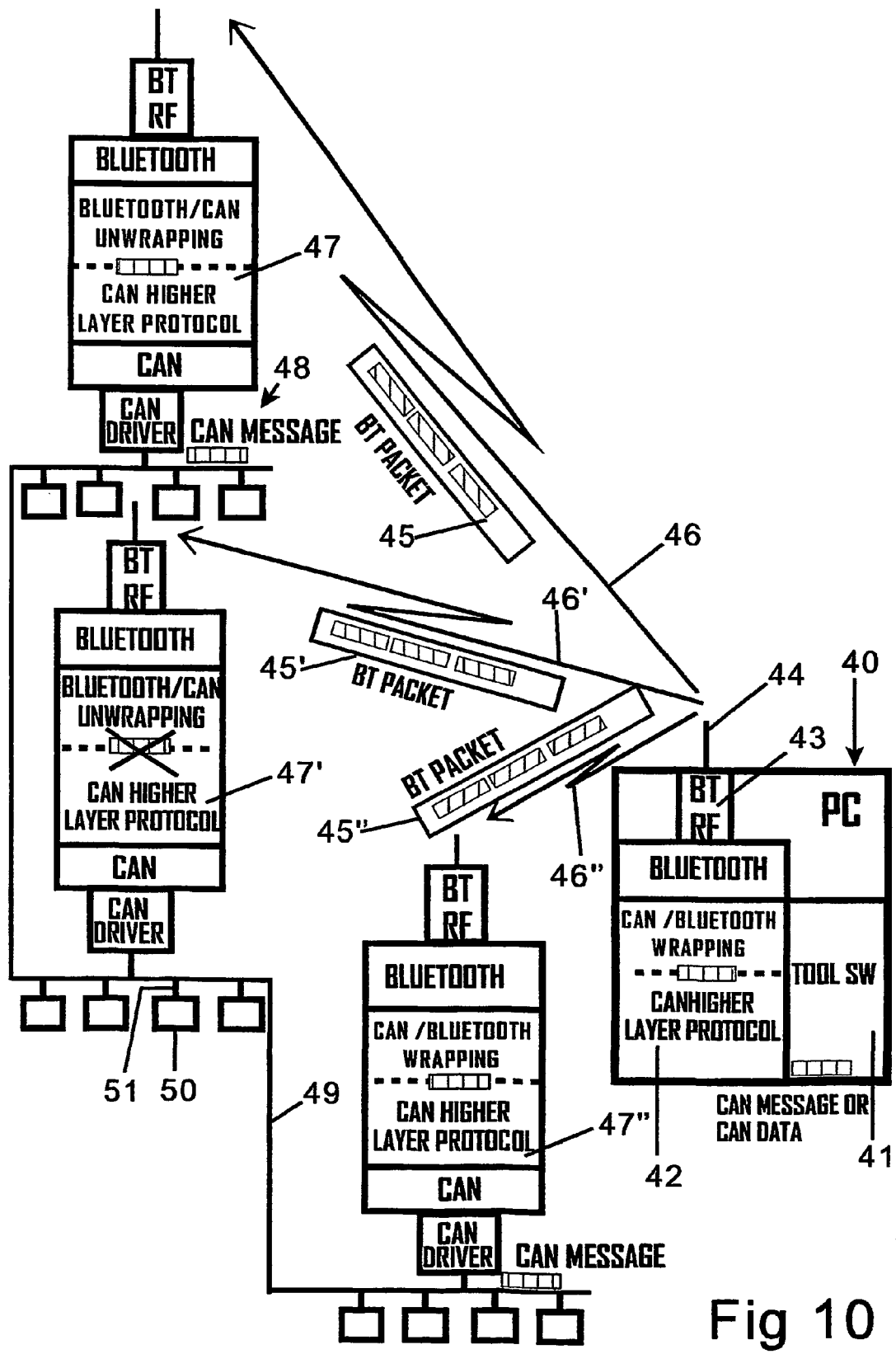

A currently preferred embodiment of an arrangement that has the significant characteristics of the invention will be described below with reference to the attached figures, in which FIG. 1 shows schematically and in principal diagram form, a transmitting node or transmitter unit which transmits information in question to receiver units in a CAN system and where the receiving nodes transmit or forward all or parts of the received information to the distributed control system (CAN), FIG. 2 shows an enlargement of receiving nodes operating in parallel which, in the event of wireless links not subject to interference, receive in parallel and in a coordinated way the messages received from the transmitting node or transmitter unit, FIG. 3 shows in principal diagram form coordinated and simultaneous transmission of the messages received in the receiver units on the system's few-wire link or bus, and forwarding to the executing device incorporated in or connected to one or more nodes in the CAN system, FIG. 4 shows in principal diagram form, the system according to FIG. 1, but where the wireless transmissions to the receiving nodes are partly or completely not subject to interference to one or more of the receiving nodes and are partly subject to interference or are absent to other nodes, FIG. 5 shows enlarged and in principal diagram form, receiving nodes in the system according to FIG. 4, FIG. 6 shows in principal diagram form that only receiving nodes with radio links from the transmitting node or transmitter unit that are not subject to interference effect a connection to the few-wire link for forwarding to the executing device in question in a node connected to the few-wire link, FIG. 7 shows in an enlarged and principal diagram form, a receiving node with wireless radio link from the transmitting node or transmitter unit in question subject to interference, FIG. 8 shows in diagrammatic form, a concrete example of the construction of a message with an SSI value part, a g-node identifier part, a PC message node and a data part, FIG. 9 shows in principal and from above in a horisontal view vehicles/cars in a garage, and FIG. 10 shows schematically units arranged in a Bluetooth arrangement.

There can be two types of link incorporated in the system, wireless links and wired links. Wired links also include optical connections via opto links. The transmission of messages can be carried out in two steps (a) and three steps (b):
a) 1. From wireless transmitter to wireless receivers
   2. From wireless receivers to wired link
b) 1. From wired link to wireless transmitter(s)
   2. From wireless transmitter to wireless receivers per channel
   3. From wireless receivers to wired link.

The wireless transmitters each transmit on their own "channel". A channel is characterized in that, when transmitting, each transmitter has access to a part of the available bandwidth in the ether which is exclusive to the system. The exclusivity can be an allocated frequency in a time interval, for example as in the known Bluetooth protocol or IEEE 802.11 for jumping frequency or a correlation code as in IEEE 802.11 Direct Sequence Spread Spectrum. A transmitter and one or more receivers can operate on one and the same channel during one and the same time interval.

Nodes which are connected both to the wireless network and to the wired network are here designated g-nodes. They act as "gateways", that is they receive a complete message on the wireless link and ascertain in a known way that it has been correctly received, by means of check codes, error-correction codes, etc. Thereafter the message is transmitted on the wired link. Each message has an identity on the respective medium which is at least unique for that transmission occasion. The identity can be a bit code or can consist of a particular time slot in a scheduled system or a combination of these methods. The identity can be common or different for the two media. If they are different, the association between the identities is known by the respective g-node. Such an association can be made in a plurality of ways, some of which are described in the patent referred to above.

In one embodiment, the Bluetooth protocol can be modified so that several slaves are allocated the same time slot for reception. A CAN message (here an LLC data frame) is generated in a PC (computer/micro-computer/processor) equipped with a radio interface of the Bluetooth type. The CAN message is packaged as data in a Bluetooth message which is sent by the PC and received by two or more g-nodes. The g-nodes that have received the CAN message error-free according to the Bluetooth protocol's error-detection mechanisms thereafter send out the CAN message on the CAN bus. If several g-nodes commence their transmission synchronized to the same Strat of Frame (SOF), they will simultaneously send the message bit by bit, which will work because the messages are identical. If any g-node or g-nodes can not synchronize with the message that the first g-node sends, then they change over into receiving nodes in accordance with the CAN protocol. They will then receive a message that is identical to the one they were in the process of sending. When they have ascertained that such is the case, they can refrain from sending the message. In this way, a parallel redundancy is achieved for signalling from the PC to the CAN network. In the opposite direction, serial redundancy can be achieved. Each g-node is allocated a time slot for transmission and information about which CAN identifier identifies the CAN messages that are to be sent to the PC. At the same time, they obtain the messages on the CAN bus in accordance with the CAN protocol. The messages that are to be sent to the PC are packaged as data in a Bluetooth message that is sent in the respective time slot. The PC then receives one or more identical messages from the CAN system. This method is here designated "P-presentation".

If information is required about which recipient has received the strongest signal, the following procedure can be applied. It assumes that the radio part of the g-nodes provides a value for the signal strength, (signal strength indicator, SSI), for example a measurement value 0-255. The CAN identifier is then divided into at least three fields: One which contains the value 255–the SSI value, one which indicates which g-node is sending the message and one which indicates that it is one (of several) messages from the PC. Now if the SSI value–255 is inserted first in the CAN identifier, the g-node that has the highest signal strength will gain access to the bus if all the g-nodes commence signalling simultaneously. The information about which g-node has the strongest signal and the actual value of this is thus to be found in the CAN identifier and is available to all nodes that can use this information. In an example of organisation of CAN identifiers by signal strength, the identity can be used of up to 16 g-nodes and the identity of up to 64 messages from the PC. More information about how CAN identifiers can be constructed to give the required characteristics is to be found in the specification for the known CAN-Kingdom protocol. This method is called "SSI-presentation".

In the event of a so-called multipath situation, messages with errors can be obtained, in spite of the signal strength being high. The messages with errors can be detected by the error-detection mechanism in the protocol as bit errors in the message. If the error persists, the conclusion can be drawn that there is a multipath situation and measures can be implemented in the form of a change of transmitter, transmitter position, amendment of propagation diagram, etc.

The invention can be used in connection with mobile transmitters. In the first position a transmitter has contact with two receivers, then three, thereafter two. Maximal transmission reliability is ensured in a simple way by means of P-presentation. Using SSI-presentation, it is also possible to obtain a good idea of where the mobile transmitter is located. Examples of combinations of a mobile transmitter and a fixed network can be a car in a garage, a car at a service station, an ignition key (or corresponding item that can comprise a similar function, for example a mobile phone, identity card, etc,) for a vehicle.

In FIG. 1 a distributed control system of the control area network type is provided by CAN (or CAN KINGDOM). The system comprises or interacts with a transmitting node or transmitter unit 1 which can consist of a computer-based node or unit of a known type. The node or unit 1 can consist of a mobile unit which in a known way is connected to or incorporated in a mobile system, for example an ordinary mobile system which is incorporated in or connected to the general or public telecommunications network. The node or unit 1 can be arranged to be fixed, which can be the case for service units associated with car repair workshops. A car repair workshop installation is indicated by 2 in FIG. 1. The transmitting node or transmitter unit 1 can also be arranged to be mobile, where reference is made to the movement of the mobile units in the said telecommunications and/or data system which is symbolized by 3 in FIG. 1.

The transmitting node or transmitter unit 1 is thereby of the type that can effect transmission of radio messages. The node or unit is thereby provided with one or more antennas 4. The node or unit 1 shown in FIG. 1 is of the type that establishes wireless connections, in this case radio links 5, 6, 4, 7, 8, etc. Alternatively, the transmitting node or transmitter unit 1 can consist of two or more transmitting nodes or transmitter units. The transmission of the messages or information in question on the different frequencies is carried out in different directions which are symbolized by 9, 10, 11 and 12 in FIG. 1. The transmission is carried out to the receiver units 13, 14, 15, 16, etc. These receiver units are provided with antennas 17, 18, 19 and 20 respectively. The receiver units are thus tuned for frequencies in the respective link and the frequencies are preferably selected in the free ISM band, where the 2.45 GHz or 5.8 GHz band can be used. The receiver units 13, 14, 15 and 16 are connected in a known way to a few-wire digital link which is normally used in the control area system in question. Further nodes 22, 23, 24, 25, 26, etc, are also connected to the few-wire link or the bus 21. The link 21 can be relatively long and the different receiving nodes 13, 14, 15, and 16 and said additional nodes 22, 23, 24, 25 and 26 are geographically separated. The transmission from the transmitting node or transmitter unit to the receiver unit is in this case digital and the links operate with slot functions. The respective message can comprise identification bits and code bits in a so-called "Header", data bits D, and code bits and control bits in a so-called "Tail". Such a message is indicated by 27 in FIG. 1. The message in question is transmitted via the link 5. Corresponding messages are transmitted via the links 6, 7, 8, etc. The few-wire link 21 and the nodes connected to it also operate digitally. The nodes or units incorporated in the system are mutual time-clearances in the present application and in the said Swedish application 0001148-6. A vehicle is also indicated in FIG. 1 and is designated 2'. Reference is hereby made to the said Swedish patent applications, which is also the case concerning the said machines and/or processes. The units or components incorporated in a process are indicated by 2" in FIG. 1. In FIG. 1 the geographical distances between the receiver units 13 and 14 and the receiver units 14 and 15 are indicated by A and B respectively.

FIG. 2 shows how messages 27, 27', 27", etc, which are received by the receiver units 13, 14, 15 via the links 5, 6, 7, and 8, are downloaded in parallel and simultaneously in the receiver units 13, 14, 15, 16, etc. In the present case half of the downloading function has been implemented, that is the first parts 27a, 27'a, 27"a, etc, have been downloaded in the respective units 13, 14, 15, etc. Continued downloading of the parts 27b, 27'b, 27"b of the message will be carried out in the continued downloading procedure. This downloading of the message in the receiver units 13, 14, 15, 16, etc, is carried out in a known way and reference is made among other things to the references listed above. The coordinated downloading function can be synchronized using the time functions in the system. The messages to the various receiver units are constructed in a corresponding or similar way.

FIG. 3 shows among other things that the messages 27, 27', 27", etc, transmitted in parallel from the transmitting node or the transmitter unit 1 (FIG. 1) via the links 5, 6, 7, 8, etc, have completed being downloaded at the nodes 13, 14, 15, 16, etc. These nodes have essentially the same construction, at least concerning the said receiving functions and transmitting and interacting functions respectively via the few-wire link 21. In accordance with the concept of the invention, in the case shown in FIG. 1 with links that are not subject to interference between the transmitting node or transmitter unit and the receiving nodes 13, 14, 15, 16, there is parallel connection of the receiver units to the few-wire link.

Using this connection, the said messages 27, 27', 27" or parts thereof are transmitted via known means 13a, 14a, 15a, etc, to the few-wire link 21. The parallel and simultaneous connection to the link 21 is shown by i1, i', i". As a result of the parallel and simultaneous transmission of the messages to the few-wire link 21, a number of messages are obtained on the few-wire link which in principle are laid one on top of each other. In FIG. 3, this has been symbolized by the frames or blocks 28, 29, 30, 31, etc, which refer to the messages 27, 27', 27" and 27''' respectively. In FIG. 3, for the sake of clarity the blocks or frames 28, 29, 30 and 31 have been shown laid out in a common plane (the plane of the paper). The overlaying of each other by the messages has been symbolized by arrows 32, 33 and 34. The frames or blocks appearing at the link 21 have also been illustrated by reference arrows 35, 36, 37, 38, etc, to the various receiver units. The messages thus appearing on the few-wire link are received in the additional receiving nodes, of which one receiving node 39 has been shown in FIG. 3. The additional receiving node 39 in question receives all or parts 40 of the said message which is sent on the link 21 by the units 13, 14, 15, 16, etc, The node 39 utilizes the received information or the received message in a known way in order to control the executing device 41. The direction of reception is indicated by 42 and the reception signals are indicated by i'''. The unit 39 comprises a processing device 43 which processes or selects information content from the received message 40 or part of the message 40 for forwarding to the executing device 41. The construction of the message can thereby be of the kind that comprises an identification part ID and a code part C. In addition, there is a data part and code and control parts CRC and CH respectively. The parts ID and C form the "Header" and the parts CRC and CH form the "Tail". In accordance with the above, the transmitting node or transmitter unit (see FIG. 1) consists of or comprises a mobile unit in the mobile system GSM which is provided with Bluetooth function. In a corresponding way, the distributed control system operates with message constructions that correspond to or are obtained from the said mobile system. Messages can in principle be sent in the opposite direction, but this two-way case does not concern the present invention and will therefore not be described here in greater detail.

FIG. 4 shows the construction according to FIG. 1 with the transmitting node or transmitter unit 1 and the receiving nodes 13, 14, 15 and 16 and the additional units 22, 23, 24, 25 and 26. In this case, only the link 5 is established, so that there is a radio link that is essentially not subject to interference between the node or unit 1 and the receiver unit 13. A block 44 blocks the radio link 6 so that there is no connection to the node 14. The radio link 7 passes a block 45 which brings about a considerable interference in the radio link in question to the node 15. The link 8 is reflected by a block 46 so that no other radio link or links reach the receiver unit or receiver units 16 either. Thus, in this case, it is only the receiving node 13 that can forward the message to the few-wire link 21 and thereby to the executing devices in additional receiving nodes.

FIG. 5 shows that the receiving node 13 can download the message 27 in accordance with the above. The nodes 14 and 16 have in this case no radio link with the transmitting node or transmitter unit 1 according to FIG. 4. The receiving node 15 receives a message that is essentially subject to interference 27" via the radio link 6.

FIG. 6 shows that only the receiver unit 13 transmits the message 27 to the link 21. Other receiving nodes are not connected to the few-wire link by the circuits 14a, 15a, etc, not being activated for access to and transmission on the link 21. Like other receiving nodes, the said receiver units 14, 15, 16 detect the message transmitted by the node 13 on the few-wire link 21. The arbitration function in the system can thereby be selected so that when the nodes 14, 15, 16 detect all or parts of the message 27 that was transmitted by the node 13 on the link 21, [they] are prevented from making further attempts to connect to the few-wire link after the unit 13 has sent the message 27. The detected or received part or the detected or received message can thereby cause a circuit 14b, 15b, etc, in the receiving nodes 14, 15, 16 to generate a cancellation signal that prevents the unit 14, 15, 16, etc, in question from attempting to make further subsequent connections. FIG. 6 also shows a signal i2 which is a selection signal that selects the receiving node which has the link which is the least subject to interference in the case where all the receiver units 13, 14, 15, 16, etc, have links that are subject to interference. Only the selected link is thereby connected to the few-wire link. The signal i2 is shown only symbolically and is generated in all the receiver units 13, 14, 15, 16, etc.

FIG. 7 shows that the node 15 received a message 27' that is essentially subject to interference, and that circuits 15a prevent the transmission of that message on the link 21. FIG. 7 also shows a cancellation signal i1 which, for example, is generated in a circuit 15b [and] prevents the unit 15 from making further attempts to connect to the link 21 after the unit 13 (see FIG. 6) has sent its message 27 in question, not subject to interference, on the link 21.

FIG. 8 shows an example of a concrete construction of a message. The construction is the one described above, in which the SSI value is indicated by 28, the g-node identifier part by 29, the PC message number part by 30 and a subsequent part (the data part) by 31. In this case, the number of g-nodes is thus 16 and the number of PC message numbers is 64.

In the above, a case has been described where the node 13 obtained reception via a radio link not subject to interference and the units 14, 15, 16, etc, had radio links that were absent or essentially subject to interference. Of course, two or more receiving nodes can operate in parallel with radio links not subject to interference, while one or more nodes have radio links essentially subject to interference or absent. It can be seen thereby that the system is highly insensitive to various interference phenomena that can arise in association with the radio links.

A unit that is not yet connected can listen on a fixed frequency where it knows that time messages will appear. These can, in addition to the time, also contain a header that identifies the system. In this way, the unit that is not yet connected can synchronize itself to the network on the messages which are due to be sent in order to maintain the global time in the system.

FIG. 9 shows that one mobile transmitter 32 in a car in a first position 33 of the transmitter area is in contact with or covers two receivers 34 and 34a of the garage arrangement. In a second position 33' of the transmitter area this one covers three receivers 33, 35 and 36. In a third position 33" covers two receivers 35 and 36. In the shown way the transmitter area can cover different numbers of receivers at its movement into the garage. In the parked positions the transmitter areas 37, 38 and 39 can cover different numbers of receivers. Thus, the area 37 covers two, the area 38 covers one and the area 39 covers three. Thus, respective area get contacts with the receivers in varying way when the car moves and the cars are parked, respectively.

FIG. 10 refers to the above mentioned embodiment with a number of slaves allotted the same time slot. A PC-unit 40 includes arrangement (Tool/SW) for dealing with CAN messages or CAN DATA and arrangement 42 for CAN/Bluetooth wrapping and CAN Higer Layer Protocol. Via member 43 the omnidirectional antenna arrangement 44 transmits BT-Packets 45, 45', 45" in the same time slot in different directions 46, 46', 46". Units or mobiles 47, 47' and 47" receives the BT-Packets via their antennas and each unit is arranged for Bluetooth reception and having the corresponding arrangement for Bluetooth/CAN wrapping, CAN Higher Layer Protocol, CAN, and a CAN driver for attaining CAN messages to or from a bus 49, to which different units 50 are connected by means of wires 51. In the disclosed embodiment units 47 and 47" receives the BT Packets 45 and 45". The unit 47 does not receive the BT Packets owing to disturbances or another reason. The Bluetooth system creates its communication data, and the CAN-system create its own data.

The invention is not limited to the embodiments described above by way of example, but can be modified within the scope of the following claims and invention concept.

The invention claimed is:
1. An apparatus comprising:
a plurality of receiving nodes configured to receive a wireless transmission of data via wireless links from a transmitter unit; and
a few-wire link connected to the plurality of receiving nodes, the few-wire link configured to forward the data to at least one operating device;
wherein at least one of the plurality of receiving nodes is configured to receive the data using at least one of the wireless links and, in response to receiving a complete wireless transmission of the data from the at least one of the wireless links, to transmit the data to the few-wire link;
wherein the at least one of the plurality of receiving nodes is configured, in response to receiving less than a com- plete wireless transmission of data at the at least one of the plurality of receiving nodes; to not transmit received data to the few-wire link;

wherein the at least one of the plurality of receiving nodes is configured to, in response to receiving less than a complete wireless transmission of data, receive information from the few-wire link related to cancelling attempts to connect to the few-wire link after another of the plurality of receiving nodes that received a complete wireless transmission of data has transmitted the received data on the few-wire link.

2. An apparatus comprising:

a plurality of receiving nodes configured to receive a wireless transmission of data via wireless links from a transmitter unit;

a few-wire link connected to the plurality of receiving nodes, the few-wire link configured to forward the data to at least one operating device;

wherein at least one of the plurality of receiving nodes is configured to receive the data using at least one of the wireless links and, in response to receiving a complete wireless transmission of the data from the at least one of the wireless links, to transmit the data to the few-wire link;

wherein the at least one of the plurality of receiving nodes is configured, in response to receiving less than a complete wireless transmission of data at the at least one of the plurality of receiving nodes, to not transmit received data to the few-wire link;

wherein the at least one of the plurality of receiving nodes, in response to receiving less than a complete wireless transmission of data, is configured to receive data being transmitted to the few-wire link by another of the plurality of the at least one receiving nodes that received a complete wireless transmission of data, the data being transmitted to the few-wire link allowing the at least one of the plurality of receiving nodes to prevent continued attempts to access the few-wire link.

3. An apparatus in a distributed control system comprising:

a plurality of receiving nodes configured to receive a wireless transmission of data via wireless links from a transmitter unit;

a few-wire link connected to the plurality of receiving nodes, the few-wire link configured to forward the data to at least one operating device;

wherein at least one of the plurality of receiving nodes is configured to receive a wireless transmission of data from at least one wireless link and, in response to receiving a complete wireless transmission of the data from the at least one of the wireless links, to transmit the data to the few-wire link;

wherein the at least one of the plurality of receiving nodes is configured, in response to receiving less than a complete wireless transmission of data at the at least one of the plurality of receiving nodes, to not transmit received data to the few-wire link;

wherein the distributed control system is configured to select one of the plurality of receiving nodes that is least subject to interference whereby the one of the plurality of receiving nodes least subject to the interference obtains access to the few-wire link for transmission of the received data to the few-wire link.

4. An apparatus comprising:

a plurality of receiving nodes configured to receive a wireless transmission of data via wireless links from a transmitter unit;

a few-wire link connected to the plurality of receiving nodes, the few-wire link configured to forward the data to at least one operating device;

wherein at least one of the plurality of receiving nodes is configured to receive the data using at least one of the wireless links and, in response to receiving a complete wireless transmission of the data from the at least one of the wireless links, to transmit the data to the few-wire link;

wherein the at least one of the plurality of receiving nodes is configured, in response to receiving less than a complete wireless transmission of data at the at least one of the plurality of receiving nodes, to not transmit received data to the few-wire link;

the apparatus further comprising a plurality of g-nodes connected both wirelessly to the transmitter unit and wired to the few-wire link and configured to receive a message associated with the wireless transmission of the data, wherein the g-nodes are configured to determine if the message is correctly received through use of at least one code;

wherein a first of the plurality of g-nodes sends a message and a second of the plurality of g-nodes, in response to failing to synchronize with the message, does not re-send the message.

5. An apparatus comprising:

a plurality of receiving nodes configured to receive a wireless transmission of data via wireless links from a transmitter unit;

a few-wire link connected to the plurality of receiving nodes, the few-wire link configured to forward the data to at least one operating device;

wherein at least one of the plurality of receiving nodes is configured to receive the data using at least one of the wireless links and, in response to receiving a complete wireless transmission of the data from the at least one of the wireless links, to transmit the data to the few-wire link;

wherein the at least one of the plurality of receiving nodes is configured, in response to receiving less than a complete wireless transmission of data at the at least one of the plurality of receiving nodes, to not transmit received data to the few-wire link and to receive information related to disconnection from the few-wire link.

6. The apparatus of claim 5 wherein the transmitter unit sends data to the plurality of receiving nodes on different frequencies.

7. The apparatus of claim 6 wherein the data forms messages having system identification, data length codes and control codes.

8. The apparatus of claim 5 wherein, in response to interference reaching a predetermined level at the at least one of the plurality of receiving nodes, the at least one of the plurality of receiving nodes is configured to not transmit received data and, is further configured to generate a cancellation signal to disconnect the at least one of the plurality of receiving nodes from the few-wire link.

9. The apparatus of claim 5 wherein the plurality of receiving nodes and at least one operating device are located in a vehicle, the at least one operating device configured to control function executors.

10. The apparatus of claim 5 wherein the transmitter unit is fixed at a location.

11. The apparatus of claim 5 wherein the transmitter unit is movable.

12. The apparatus of claim 5 wherein the data is configured for use in a Bluetooth system.

13. The apparatus of claim 5 wherein the plurality of receiving nodes are synchronized by connection and arbitration functions.

14. The apparatus of claim 5 wherein the plurality of receiving nodes are synchronized by time functions associated with the control system.

15. The apparatus of claim 5 wherein the transmitter unit includes a plurality of wireless transmitters, each wireless transmitter configured to transmit on a separate frequency.

16. The apparatus of claim 15 wherein each separate frequency is an allocated frequency in a time interval.

17. The apparatus of claim 5 wherein the transmitter unit includes a plurality of wireless transmitters, each wireless transmitter configured to operate on a same frequency during a same time interval as at least one of the receiving nodes.

18. The apparatus of claim 5 further comprising g-nodes connected both wirelessly to the transmitter unit and wired to the few-wire link and configured to receive a message associated with the wireless transmission of data, the g-nodes configured to determine if the message is correctly received through use of at least one code.

19. The apparatus of claim 18 wherein at least one of the g-nodes provides a value for a signal strength relating to the wireless transmission of the data from the transmitter unit to the plurality of receiving nodes.

20. The apparatus of claim 19 wherein the g-node having the highest value for a signal strength obtains access to the few-wire link.

21. A method comprising:
receiving data from a wireless transmitter unit at a receiving node;
if the receiving node is subjected to interference, not transmitting received data from the receiving node to a few-wire link;
if the receiving node receives complete data from the wireless transmitter unit, transmitting the data from the receiving node to at least one operating device via the few-wire link; and
receiving information at the at least one receiving node subject to interference concerning disconnection of the at least one receiving node from the few-wire link.

22. The method of claim 21 further comprising:
synchronizing the receiving node by transmitting received data to a few-wire link in response to receiving complete data from the wireless transmitter unit.

23. A method comprising:
receiving data from a wireless transmitter unit at a plurality of receiving nodes;
if one of the receiving nodes is subjected to interference, not transmitting received data from the one of the receiving nodes subjected to interference to the few-wire link;
if at least one of the receiving nodes receives complete data from the wireless transmitter unit, transmitting the data from the at least one of the receiving nodes that received a complete wireless transmission of data to at least one operating device via the few-wire link; and
allowing the plurality of receiving nodes access to the few-wire link in response to the at least one receiving node receiving the complete wireless transmission of data and transmitting the received data to the few-wire link wherein the at least one receiving node is configured to, if subjected to the interference, obtain information from the few-wire link concerning cancelling attempts to connect to the few-wire link after the at least one receiving node receiving the complete wireless transmission of data has transmitted the received data on the few-wire link.

24. An apparatus comprising:
a receiving node configured to receive a wireless transmission of data from a transmitting unit via at least one wireless link, the receiving node configured to connect to a few-wire link connected to at least one other receiving node;
the receiving node configured to monitor communication on the few-wire link and receive data transmitted to the few-wire link through monitoring the communication;
the receiving node configured to receive a wireless transmission of data using the at least one wireless link and, in response to receiving less than a complete wireless transmission of data, to receive data being transmitted to the few-wire link by the at least one other receiving node and to not transmit the data received using the at least one wireless link to the few-wire link based at least in part on the data being transmitted to the few-wire link, wherein the data being transmitted to the few-wire link includes all or part of the wireless transmission of data the receiving node received from the transmitting unit.

25. The apparatus of claim 24, wherein the receiving node is further configured, in response to receiving a complete wireless transmission of data, to transmit the data to the few-wire link.

26. The apparatus of claim 24 wherein the data being transmitted to the few-wire link forms messages having system identification, data length codes, and control codes.

27. The apparatus of claim 24, wherein the at least one other receiving node and at least one operating device are located in a vehicle, the at least one operating device configured to control function executors.

28. The apparatus of claim 24, wherein the receiving node is further configured to be synchronized with the at least one other receiving node by connection and arbitration functions.

29. The apparatus of claim 24, wherein the receiving node is further configured to receive a message associated with the wireless transmission of data and to communicably connect to at least one g-node configured to determine whether the message is correctly received through use of at least one code.

30. The apparatus of claim 24, wherein the receiving node is further configured to provide a value for a signal strength relating to the wireless transmission of the data.

31. The apparatus of claim 30, wherein the receiving node is further configured to receive values for signal strength relating to the wireless transmission of the data received at the at least one other receiving node, and in response to having a greater signal strength value than the at least one other receiving node, to transmit the data to the few-wire link.

32. An apparatus comprising:
a receiving node configured to receive a wireless transmission of data from a transmitting unit via wireless links, and configured to connect to a few-wire link connected to at least one other receiving node; and
the receiving node configured to receive the data using at least one of the wireless links and, in response to receiving less than a complete wireless transmission of data, to receive data being transmitted to the few-wire link by the at least one other receiving node,
wherein the receiving node is further configured, in response to receiving less than a complete wireless transmission of data, to receive information from the few-wire link related to cancelling attempts to connect to the few-wire link after the at least one other receiving node has transmitted the data on the few-wire link.

33. The apparatus of claim 32, wherein the receiving node is further configured, in response to receiving less than a complete wireless transmission of data, to not transmit received data to the few-wire link.

* * * * *

UNITED STATES PATENT AND TRADEMARK OFFICE
CERTIFICATE OF CORRECTION

| | | |
|---|---|---|
| PATENT NO. | : 8,072,877 B2 | Page 1 of 1 |
| APPLICATION NO. | : 10/380069 | |
| DATED | : December 6, 2011 | |
| INVENTOR(S) | : Fredriksson | |

It is certified that error appears in the above-identified patent and that said Letters Patent is hereby corrected as shown below:

On the Title Page, in Field (56), under "OTHER PUBLICATIONS", in Column 2, Line 2, delete "Possiblities" and insert -- Possibilities --, therefor.

On the Title Page, in Field (57), under "ABSTRACT", in Column 2, Line 20, delete "of" and insert -- or --, therefor.

In Column 3, Line 39, delete "horisontal" and insert -- horizontal --, therefor.

In Column 4, Line 22, delete "Strat" and insert -- Start --, therefor.

In Column 4, Line 65, delete "in spite" and insert -- inspite --, therefor.

In Column 8, Line 34, delete "Higer" and insert -- Higher --, therefor.

In Column 10, Line 55, in Claim 8, delete "and," and insert -- and --, therefor.

Signed and Sealed this
Twenty-sixth Day of June, 2012

David J. Kappos
*Director of the United States Patent and Trademark Office*